US008600992B2

United States Patent
Choi et al.

(10) Patent No.: US 8,600,992 B2
(45) Date of Patent: Dec. 3, 2013

(54) COORDINATING PROBLEM RESOLUTION IN COMPLEX SYSTEMS USING DISPARATE INFORMATION SOURCES

(75) Inventors: Christopher Y. Choi, Southport (AU); Neil I. Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 13/211,450

(22) Filed: Aug. 17, 2011

(65) Prior Publication Data
US 2013/0046764 A1 Feb. 21, 2013

(51) Int. Cl.
*G06F 17/30* (2006.01)

(52) U.S. Cl.
USPC .......................................... 707/736; 707/740

(58) Field of Classification Search
USPC ................ 707/694, 737, 749, 751; 706/1, 50; 714/25, 26
See application file for complete search history.

(56) References Cited

U.S. PATENT DOCUMENTS

| 5,528,516 | A | 6/1996 | Yemini et al. |
| 7,257,735 | B2 | 8/2007 | Arend |
| 7,263,632 | B2 | 8/2007 | Ritz et al. |
| 7,853,538 | B2 * | 12/2010 | Hildebrand ........................ 706/1 |
| 8,150,816 | B2 * | 4/2012 | Lim ................................ 707/694 |
| 2005/0228763 | A1 | 10/2005 | Lewis et al. |
| 2009/0063387 | A1 | 3/2009 | Beaty et al. |

OTHER PUBLICATIONS

"Classification Module, for advanced content classification", IBM Corporation, http://www-01.ibm.com/software/data/content-management/classification/, accessed Aug. 5, 2011, 1 page.

* cited by examiner

*Primary Examiner* — Monica Pyo
(74) *Attorney, Agent, or Firm* — Stephen J. Walder, Jr.; Jeffrey S. LaBaw

(57) ABSTRACT

Mechanisms for correlating reported problem data from a plurality of sources of information are provided. A report of a problem in a computer system is received to thereby generate a reported problem in a problem management system. Data is collected from a plurality of sources of information in accordance with data collection rules. Content classification is performed on the collected data to classify the collected data into pre-determined classes of collected data in accordance with classification rules. Correlation of the classified data into sets of correlated data in accordance with correlation rules is performed. Each set of correlated data corresponds to a different reported problem in the problem management system. A representation of the reported problem in the problem management system is updated based on a set of correlated data corresponding to the reported problem and classifications of data within the set of correlated data.

16 Claims, 4 Drawing Sheets

COORDINATING PROBLEM RESOLUTION IN COMPLEX SYSTEMS USING DISPARATE INFORMATION SOURCES

BACKGROUND

The present application relates generally to an improved data processing apparatus and method and more specifically to mechanisms for coordinating problem resolution in complex systems using disparate information sources.

As technology improves, advantages provided by such improved technologies tend to lead to products/systems that become increasingly complex. In a number of industries, including the middleware-based software industry, products/systems are increasingly constructed by integrating discrete components, e.g., databases, application servers, open source software packages, and the like. While this leads to economies of scale in design and construction, a larger portion of problems/faults with these systems are complex to diagnose due to the interaction between these discrete components. Resolving issues that arise in these systems often requires a deep knowledge in one or more areas, such as performance, third party integration, and the like, as well as an overall knowledge of the products/systems. Staffing traditional support/customer service personnel having the required knowledge to diagnose all of the possible sources of problems/faults is not always economical, whether considering small or large organizations.

For example, FIG. 1 is an example diagram illustrating a typical information flow within an information technology (IT) organization to resolve a problem in a complex system. In FIG. 1, arrows on lines in the diagram between entities are indicative of the direction in which communication is initiated. The boxes in FIG. 1 represent particular entities with which communication is performed to try to resolve the problem within the complex system.

Modern organizations provide a myriad of ways for employees to communicate with each other. Common examples include electronic mail (email), instant messaging, web-based discussion forums, and the like. These different forms of communication can be used both for formal channels of communication and informal channels of communication. In FIG. 1, solid lines represent formal channels of communication, e.g., referral/escalation using established policies and mechanisms specified by the organization such as generating an electronic trouble ticket, transferring the electronic trouble ticket, etc., whereas dashed lines represent informal channels of communication between entities, e.g., instant messaging, web-based discussions, etc. with colleagues or the like.

Thus, in the depicted example of FIG. 1, a customer 110 or on-site professional services 120 may report a fault of the complex system to a level 1 support team 130 and try to resolve the fault using formal communication channels. In addition, the customer 110, professional services 120, and even the level 1 support team 130 may communicate informally with subject matter experts 140 to try to resolve the fault. The subject matter experts 140 may themselves contact a product development team 150 to obtain their expertise regarding the possible source and solution to the fault through informal communication channels.

Not being able to resolve the fault at the level 1 support team 130, the fault resolution may be escalated to the level 2 support team 160 who may also consult the subject matter experts 140 through informal communication channels. If the fault is not able to be resolved at this level, the fault resolution may again be escalated to a level 3 support team 170 who may communicate with the subject matter experts 140 via informal communication channels and the product development team 150 directly using formal communication channels.

An advantage of having a rich communication network that uses both formal and informal communication channels is that this can often lead to problem/fault resolution more quickly than having to rely solely on formal business processes and communication channels alone. This is because individuals can leverage their professional network to access the knowledge of other individuals that may not be part of the formal communication channels or may be at a different level in the formal communication channel and who can be accessed earlier in the problem/fault resolution process through informal communication channels. Moreover, these other individuals may be located in different time zones and even continents and the benefits of such geographically dispersed personnel can be used to resolve problems/faults more quickly. For example, a consultant in North America may be able to confer with a colleague in the Asia Pacific region of the world, who they met at a conference, overnight (North America time) to resolve a problem before the next working day.

A disadvantage of the rich communication networks is that the resolution of a problem is often uncoordinated despite good intentions of all concerned. For example, when describing a problem to a support team, a customer may limit the problem description to only that team's product. The broader system context may be important to the resolution of the problem, but it may not be obvious to the person describing the issue, and challenging for the person receiving the problem report to always know what to ask to get that context. Moreover, as a problem report gets escalated or transferred from one person to another within the organization, information may be lost in the transfer from one person to another or may need to be repeated, leading to more difficulty in resolving the problem and more frustration on the persons involved in the resolution of the problem.

Another disadvantage is that some problems are not accurately prioritized due to the various discussions of the problem at various levels of the problem resolution process not being correlated. This can lead to the a situation such as described in the well known story of the "blind men and the elephant" where each person has knowledge of only a part of the overall situation and these parts may lead to different conclusions as to the nature of the problem and its resolution. As a result, the persons involved in the resolution of the problem may not adequately realize the correct priority or severity of the problem and its resolution.

SUMMARY

In one illustrative embodiment, a method, in a data processing system, is provided for correlating reported problem data from a plurality of sources of information. The method comprises receiving a report of a problem in a computer system of the data processing system to thereby generate a reported problem in a problem management system of the data processing system. The method further comprises performing data collection on a plurality of sources of information within the data processing system in accordance with data collection rules to generate collected data. Moreover, the method comprises performing content classification on the collected data to classify the collected data into pre-determined classes of collected data in accordance with classification rules to thereby generate classified data. In addition, the method comprises performing correlation of the classified data into sets of correlated data in accordance with correlation rules, wherein each set of correlated data corresponds to a different reported problem in the problem management system. Furthermore, the method comprises updating a representation of the reported problem in the problem management system based on a set of correlated data corresponding to the reported problem and classifications of data within the set of correlated data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise a problem management system implemented by at least one processor, a content classification engine implemented by at least one processor and coupled to the problem management system, and a correlation engine implemented by at least one processor and coupled to the problem management system and the content classification engine. The problem management system, content classification engine, and correlation engine operate to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
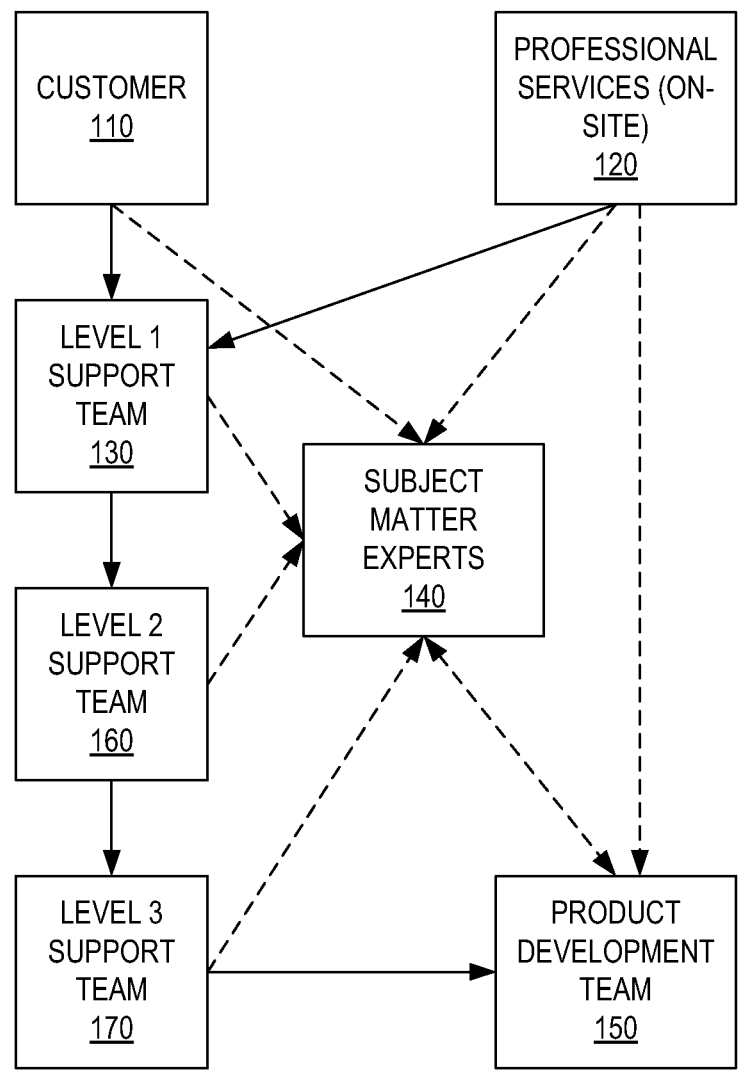
FIG. 1 is an example diagram illustrating a typical information flow within an information technology (IT) organization to resolve a problem in a complex system.

As noted above, the disadvantages of rich communication networks that utilize both formal and informal communication channels center around the fact that information exchanged on these various communication channels is not coordinated or correlated. In the context of the present description, formal communication channels are those that involve human actors and systems as described in a governing business process and are supported by specialized information technology systems. Informal communication channels are those that use general purpose communication tools, e.g., electronic mail, instant messaging, and the like. The persons involved in informal communication channels may have a relationship established through mentoring, chance meeting (such as at a conference, either physical or virtual), or any of a number of ways. The relationship between the people involved in an informal communication, while supported and even encouraged by the organization, is not mandatory in the context of an information technology support business process as described in the formal communication channel.

If the information exchanged during the various discussions on the various communications channels could be correlated, an accurate representation of the problem, its priority or severity, and the resolution of the problem may be obtained so that resolution of the problem is made more quickly and with less expense. For example, if a subject matter expert receives an adhoc query from a colleague via electronic mail or instant messaging, and their view of the severity of the issue could be combined with a customer's statement of business impact from a formal problem management system along with a separate discussion thread from a web-based forum, then the true nature of the problem and its impact (or priority/severity) could be better understood. This could lead to better allocation of human capital to investigate and resolve the problem as well as direct problem resolution in a particular direction.

The illustrative embodiments provide mechanisms for coordinating the use of information from disparate sources to resolve problems in complex products/systems. The illustrative embodiments correlate information from these various sources to identify data that relates to the same incident, better assess the complexity of the issue associated with the incident, and expedite resolution of the problems associated with the incident and the complex issue. The mechanisms of the illustrative embodiments leverage information from sources beyond the formal communication channels, accelerate the resolution of problems in complex systems by harnessing new intelligence created form the correlation of existing data, and provide individuals reporting problems of a complex product/system with a higher level of satisfaction in a cost effective manner.

With the mechanisms of the illustrative embodiments, data collection mechanisms are provided for collecting data related to a problem from different sources, such as collaboration and problem management systems, which may be deployed on various computing devices of a complex system or in associated with various software components of a complex product. A classification engine is further provided for identifying a pre-defined set of data attributes and context information from the collected data and then analyzing these data attributes and context information to classify the data into pre-defined classifications. In the present description, the term "context information" comprises any information that may pertain to the identification of a problem or potentially may be used to resolve the problem. In the domain of information technology problems, context information may include hardware and software inventory (type, vendor, version) and configuration of the hardware and software inventory. Other context information that may be used in the classification operation performed by the classification engine may be information that describes the nature of the problem such as system problem, crash, incorrect numerical calculation, slow performance, and the like. The context information may further describe the source of the information included in the context information. For example, the way that the context information and data attributes is to be analyzed may be dependent upon whether the data was obtained from a problem management system, in an electronic mail thread, or the like. Thus, the context information may further comprise "origin of data" information.

A correlation engine is provided to correlate the classified data collected by the various data collection mechanisms to identify related portions of data. The related portions of data are aggregated and summarized by a normalization engine and output to a problem management system for generation and output of one or more reports for use in resolving the original problem.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
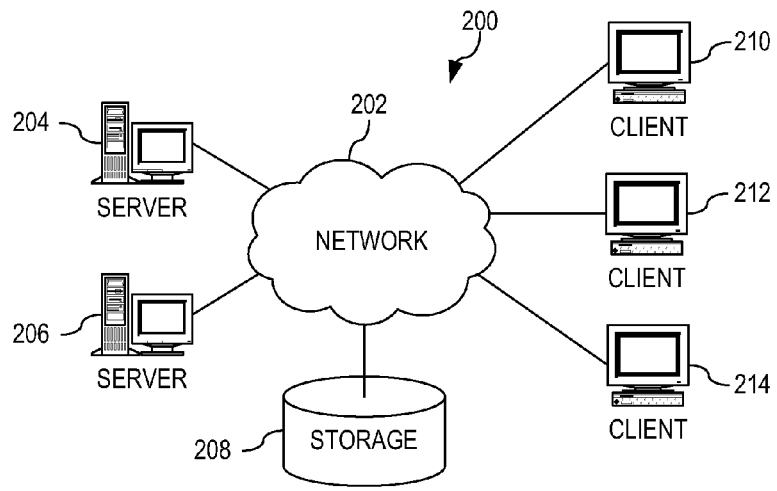
FIG. 2 depicts a pictorial representation of an example distributed data processing system in which aspects of the illustrative embodiments may be implemented.
Figure 3:
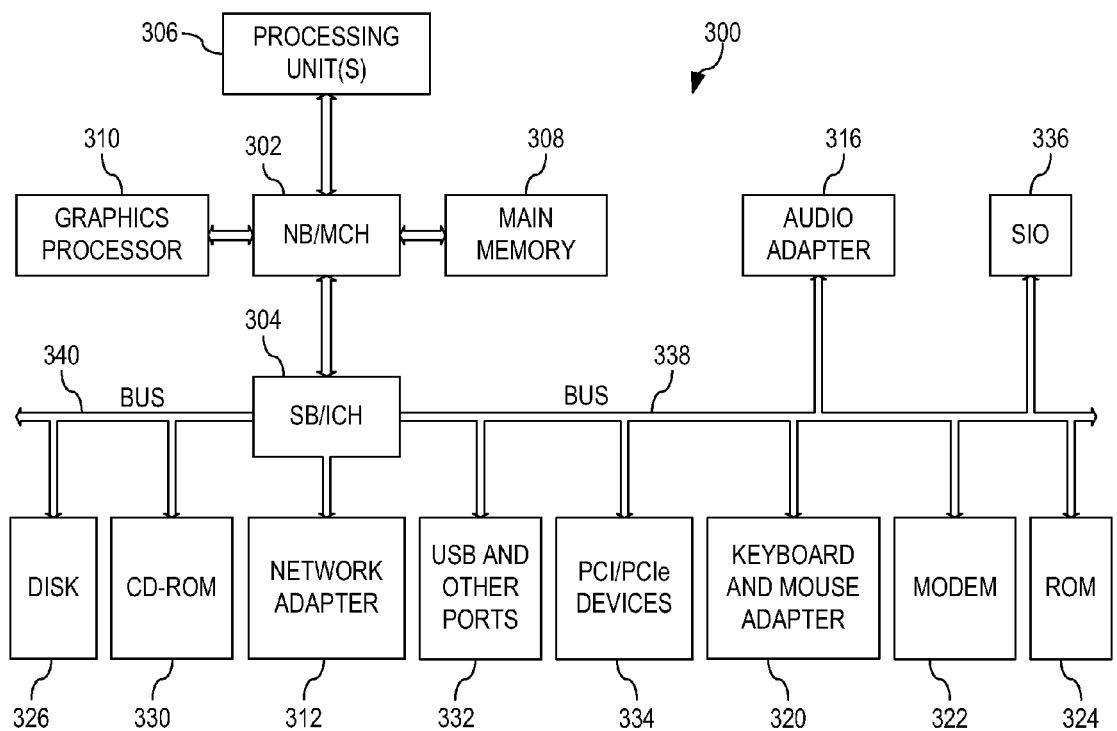
FIG. 3 is a block diagram of an example data processing system is shown in which aspects of the illustrative embodiments may be implemented.

Thus, the illustrative embodiments may be utilized in many different types of data processing environments. In order to provide a context for the description of the specific elements and functionality of the illustrative embodiments, FIGS. 2-3 are provided hereafter as an example environments in which aspects of the illustrative embodiments may be implemented. It should be appreciated that FIGS. 2-3 are only an example and are not intended to assert or imply any limitation with regard to the environments in which aspects or embodiments of the present invention may be implemented. Many modifications to the depicted environment may be made without departing from the spirit and scope of the present invention.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

With reference now to FIG. 3, a block diagram of an example data processing system is shown in which aspects of the illustrative embodiments may be implemented. Data processing system 300 is an example of a computing system in which computer usable code or instructions implementing the processes for illustrative embodiments of the present invention may be located or in which hardware logic or a combination of hardware logic and computer usable code/instructions may be provided for implementing the various aspects of the illustrative embodiments described hereafter, or equivalents thereof. The data processing system 300 may be implemented as a server computing device, a client computing device, or the like.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 202 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 204 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 204 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM® eServer™ System P® computer system, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

Those of ordinary skill in the art will appreciate that the hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device which is configured with flash memory to provide non-volatile memory for storing operating system files and/or user-generated data, for example. Essentially, data processing system 300 may be any known or later developed data processing system without architectural limitation.

With reference again to FIG. 2, an organization utilizing the distributed data processing system in FIG. 2 may implement a complex set of software products, computing devices, hardware devices, and the like, to perform various functions for the running of the organization and achieving the purposes of that organization. This complex set of software products, computing devices, hardware devices and the like, may be integrated with one another and may interact with one another in various ways based on the type of software products and hardware devices utilized and their compatible functions. For example, the complex system comprising the software, computing devices, hardware devices, and the like may comprise such components as, for example, databases, application servers, open source software packages, server computing devices, client computing devices, and the like.

For purposes of illustration, it will be assumed that the complex system that is the subject of the coordinated problem resolution mechanisms of the illustrative embodiments is a complex software system comprising a plurality of software products, such as applications, database software and storage systems, and the like, executed on one or more computing devices, such as servers 204, 206, network attached storage system 208. The complex software system may be accessed by end users via client computing devices, such as clients 210, 212, or 214. Because this complex software system comprises a plurality of software components that may be interconnected and may interface with each other in complex ways, if a problem or fault occurs in the complex software system, it may be very difficult to discern the source of the problem/fault. Furthermore, it may be necessary to obtain data from more than one source of information within the complex software system in order to accurately identify the source of the problem/fault.

This process of problem/fault detection and resolution is made even more complex if there is no coordinated way of obtaining information from these various sources of information within the complex software system. However, with the illustrative embodiments, mechanisms are provided for collecting data from a variety of sources of information, classifying that data so that it may be correlated with particular reported problems/faults, normalizing the classified and correlated data, and providing the results to a problem management system for use in generating reports and perform problem management operations to resolve the reported problem/fault.

The servers 204, 206 may further provide communication systems for facilitating various formal and/or informal channels of communication, e.g., electronic mail systems, instant messaging systems, web-based discussion forums, and the like, which may be implemented as software executing on one or more hardware devices, for example. These various communication systems may be sources of information regarding reported problems/faults in the complex software system. That is, these communication systems facilitate communication between personnel that may be reporting problems/faults and personnel involved in trying to resolve these reported problems/faults. As such, the communications being exchanged between these personnel using the communication systems may comprise data and information indicative of a severity of the problem/fault, possible sources of the problem/fault, possible solutions to the problem/fault, and other information that may be useful in resolving reported problems and faults. These various communication systems may have associated data collection mechanisms for collecting particular data and information from communications being exchanged across these communication channels in accordance with data collection rules and parameters.

The data collected from these communication systems may be provided to one or more content classification engines provided on one or more of the servers 204, 206, for example, for classification. Based on the classification of the data, the data from these various communication systems may be correlated and normalized using correlation and normalization engines which may also be provided on one or more of servers 204, 206. The results of the correlation and normalization comprises a set of data from a plurality of communication systems that are directed to the reported problem/fault. This set of data may be provided to a problem management system provided on one or more of servers 204, 206 which may use this set of data to generate reports associated with the reported problem/fault and perform other problem management operations.

Figure 4:
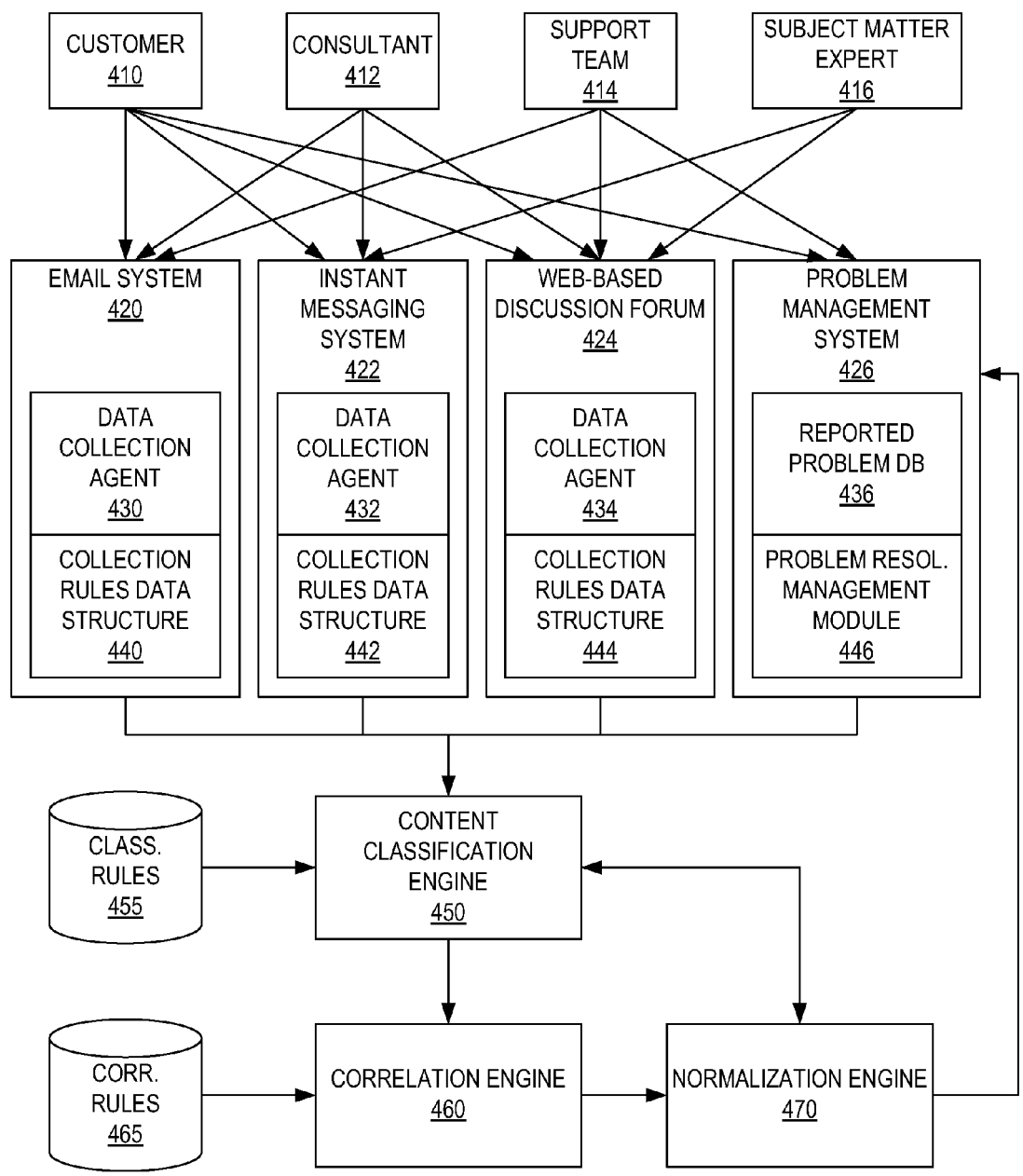
FIG. 4 is an example block diagram of the primary operational components of a coordinated problem resolution mechanism in accordance with one illustrative embodiment.

FIG. 4 is an example block diagram of the primary operational components of a coordinated problem resolution mechanism in accordance with one illustrative embodiment. The various elements shown in FIG. 4 may be implemented, for example, as software instructions executed on one or more processors of one or more data processing systems. Various memories, storage devices, and other data processing system components, such as illustrated in FIG. 3 above for example, may be provided in the data processing system(s) executing these software instructions and may be used to assist in the execution and operation of the various components illustrated in FIG. 4.

As shown in FIG. 4, various individuals, via their client computing devices 410-416, may communicate with each other regarding a problem/fault via one or more communication systems 420-424 and may report problems/faults via a problem management system 426. Moreover, the various individuals may obtain information about reported problems/faults from the problem management system 426. The problem management system 426 is responsible for receiving reports of problems/faults, create data structures for tracking information about the reported problems/faults (including generating a unique identifier for each problem/fault, such as a problem ticket number or the like, for tracking this information) in the reported problem database 436, generate reports for conveying information about the resolution of the reported problem/fault, and may coordinate efforts for attempting to resolve the reported problem/fault such as sending automatically generated communications to appropriate personnel via their computing devices to inform them of the reported problems/faults, severity of these problems/faults, and other pertinent information about the problems/faults. The problem management system 426 may perform its functions dynamically as new information is obtained regarding a reported problem/fault and changes to the status of the problem/fault resolution occur.

A problem management system, such as problem management system 426 in FIG. 4, is a set of software and information technology infrastructure that manages the lifecycle of problems. The problem management system 426 provides a central repository for recording the problems and tracking their progress through the lifecycle (open to resolved). The problem management system 426 also provides a formal communication channel between various actors involved in the problem management. For example, a customer (or user of a client computing system) reports a problem by creating a problem report in the problem management system. A level 1 engineer adds additional information about the problem in the problem report and assigns it to a level 2 engineer for further analysis. The problem report is managed by the problem management system 426. An example of a problem management system that may be used to implement aspects of the problem management system 426 and which may be augmented to work with the mechanisms of the illustrative embodiments include IBM Tivoli Service Request Manager available from International Business Machines Corporation of Armonk, N.Y.

In the depicted example, various individuals, such as a customer, a consultant, a support team member, a subject matter expert, and the like are shown as being in communication with various ones of the communication systems 420-424 and problem management system 426 via the client devices 410-416. These are only examples of the particular individuals that may utilize the mechanisms of the illustrative embodiments and other individuals having different roles than those shown in FIG. 4 may likewise utilize the mechanisms of the illustrative embodiments without departing from the spirit and scope of the present invention. Furthermore, while FIG. 4 shows certain individuals communicating with certain ones of the communication systems 420-424 and problem management system 426, the illustrative embodiments are not limited to such and these and other individuals may communicate with any one or more of communication systems 420-424 and problem management system 426 without departing from the spirit and scope of the present invention.

In the depicted example, the various communication systems 420-424 are utilized by the individuals via their client computing devices 410-416 to communicate with one another or with other individuals regarding a problem reported to the problem management system 426. The various communication systems 420-424 may comprise an email system 420, an instant messaging system 422, a web-based discussion forum 424, and the like. These are only examples of types of communication systems that may be utilized with the mechanisms of the illustrative embodiments. Other types of communication systems may also be used with the mechanisms of the illustrative embodiments either in addition to, or in replacement of the communication systems 420-424 shown in FIG. 4.

When an individual, utilizing the complex software system provided by the particular organization via their distributed data processing system, encounters a problem or fault in one or more of the software/hardware components of the complex software system, the individual may report the encountered problem/fault via their client device 410-416 to the problem management system 426. For example, customer client device 410 may be used by a customer to report a problem encountered during the use of the complex software system to the problem management system 426. The reporting may be done via a software mechanism provided in the complex software system which may be automatically initiated when a problem/fault is encountered, may be done by a software mechanism initiated by the individual explicitly for reporting the problem/fault, may be done by logging onto the problem management system 426 and using one or more user interfaces provided by the problem management system 426 for reporting the problem/fault, or the like. The reporting of the problem/fault may comprise providing various information regarding the problem/fault and the individual reporting the problem/fault. For example, the reporting of the problem may encompass specifying an identification of the particular software module or component being used when the problem was encountered (e.g., name and version number), a description of the client environment being used to access the software module or component (such as the name and version of the operating system being run on the client computing device and a hardware specification of the client computing device), a problem description, and a description of the individual providing the report of the problem (such as the name, role, department affiliation, employee number, or the like). This represents an initial data collection performed when the problem is initially reported.

Based on this information, the problem management system 426 creates one or more entries in the reported problem database 436 for tracking the reported problem and attempted resolution of the reported problem The one or more entries may store the data initially collected regarding the reported problem and may further comprise other tracking information including a unique identifier of the reported problem, sometimes referred to as a problem ticket, a support ticket, or the like. This unique identifier, hereafter referred to as the problem ticket, may be communicated back to the individual reporting the problem who can then use it to obtain updates on the status of the resolution of the problem and provide further information regarding the reported problem. Moreover, other individuals may obtain this problem ticket information from the problem management system 426, either by searching the reported problem database 436, in messages sent by the problem management system 426 to those individuals, or from communications with other individuals that have access to the problem ticket information.

The individuals involved in the resolution of the reported problem may communicate with one another via formal and/or informal communication channels provided via the communication systems 420-424. The communication systems 420-424 further have associated data collection mechanisms 430-434 for collecting data from the communications being exchanged between these individuals via the communication systems 420-424. These data collection mechanisms 430-434 may operated based on associated collection rules data structures 440-444 which specify rules and parameters for identifying when data is to be collected and what data is to be collected from the communications being exchanged via the communication systems 420-424.

The data collection mechanisms 430-434 may be implemented in many different ways. In the depicted example, the data collection mechanisms 430-434 are implemented as individual data collection agent software programs executing within, or in association with, the particular communication systems 420-424. In other illustrative embodiments, the communication systems 420-424 themselves may have the data collection mechanisms built into or integrated in them, or can be extended to collect data from communications in the manner described hereafter. In other illustrative embodiments, content aware network filters or proxies may be utilized to extract the data to be collected as the data packets of the communications are transmitted across the network, such as network 202 in FIG. 2. Other implementations of data collection mechanisms 430-434 that may become evident to those of ordinary skill in the art in view of the present description may also be utilized without departing from the spirit and scope of the present invention.

The data collection mechanisms 430-434 are configurable in accordance with the associated collection rules data structures 440-442 which specify rules and parameters for identifying data in the communications being exchanged via the communication systems 420-424 that are representative of reported problems and should be collected. These rules and parameters may specify, for example, particular types of data elements of interest and combinations of data elements of interest that are to be looked for in the communications and if they exist, the corresponding data to be collected from the communications whether that be the identified data elements of interest or additional data elements that may or may not be present in the communications.

In some illustrative embodiments, the rules are based on regular expressions and/or statistical classification techniques such as Bayesian procedures. An example regular expression that can be used by the illustrative embodiments may be of the type "PR[0-9]{8}". Assuming all problem report identifiers start with the prefix "PR" following by 8 digits, this form of rule will identify whether or not data is related to a particular problem.

In one illustrative embodiment, the data collection rules data structures 440-442 may specify that the data elements of interest in communications include a problem or support ticket number, a customer name and their geographical region, names and versions of the software components involved, description of a customer environment such as the name and version of the operating system and the hardware specification, problem description including the perceived symptoms, severity, frequency, number of users impacted, error messages, and log extracts, details of actors involved (such as their contact details and roles, e.g., customer, executive, support personnel, developer, etc.), and description of the escalation status. Communications being exchanged through the communication systems 420-424 may be analyzed by the data collection mechanisms 430-434 to identify these data elements in the communications and extract them for classification and correlation as described hereafter.

The problems being reported and the software/hardware components of complex software system may be of a sensitive nature and thus, the data being collected from the communications systems may be largely private, confidential, or otherwise sensitive. Concerns regarding security may be addressed using the data collection rules by defining the data collection rules such that only a minimal set of data elements required for classification and correlation are extracted and persisted. For example, for electronic mail communications about a particular problem, it may be sufficient to extract only the problem/support ticket number, software component names and versions, and error messages. Potentially sensitive information, such as the customer details, can be obtained via correlation from the problem management system where greater privacy controls are in place.

Moreover, role based controls and opt-in systems may be used to determine access to the collected data. For example, the data can be collected only from a specific set of communication channels used by employees in the support organization (e.g., shared electronic mail accounts, problem management systems, etc.). However, other employees may opt-in to participate in the data collection for the communication channels of their choosing.

The data collection rules 440-444 may specify different data collection rules for different communication systems 420-424, e.g., different rules for electronic mail communications as opposed to forum posts. For example, in a first set of data collection rules, the data collection rules may specify particular headers of an electronic mail message to search and what data elements to look for in those headers. For example, the data collection rules may specify that the headers of emails be searched for the terms "urgent," "classified," "secret," or the like in the subject field of the electronic mail message in combination with a problem/support ticket number or the like. Thus, each of the data collection rules 440-444 may be the same set of data collection rules, or may be different sets of data collection rules that are customized to the particular communication system 420-424 with which they are associated.

While FIG. 4 shows the data collection agents 430-434 and collection rules data structures 440-444 being only provided in association with the communication systems 420-424, it should be appreciated that the data collection agents 430-434 and collection rules data structures 440-444 may operate on other systems within the organization's data processing system that may be likely to have information relevant to the resolution of a reported problem. For example, although not shown in FIG. 4, the problem management system 426 may further be associated with a data collection agent and collection rules data structure such that data posted to the problem management system 426 or generated by the problem management system 426 with regard to reported problems may be collected, classified, correlated, and normalized along with data from other sources, such as the communication systems 420-424.

It should be noted that while FIG. 4 illustrates separate data collection mechanisms and collection rules data structures being provided for each of the communication systems, the illustrative embodiments are not limited to such. Rather, a single data collection mechanism and its associated collection rules data structure may operate on a plurality of the communication systems 420-424 or all of the communication systems 420-424 without departing from the spirit and scope of the present invention. Moreover, a single collection rules data structure may be shared amongst a plurality of data collection agents 430-434.

Having collected data representative of reported problems/faults, the collected data may be provided by the data collection agents 430-434 to a content classification engine 450. While FIG. 4 shows the data being input directly to the content classification engine 450 for simplicity, in actuality the collected data may be stored in one or more storage devices (not shown) from which the content classification engine 450 may retrieve that collected data.

The main role of the content classification engine 450 is to determine if the collected data is related to a reported problem that requires a greater amount of problem resolution management and to associate a set of classifications to assist in correlation and normalization of the collected data. To classify the collected data, the content classification engine 450 utilizes classification rules 455 to determine how to classify the collected data. The classification rules 455 may specify relationships between collected data elements and patterns of usage activities or communications, including types of communications, timings of communications, types of individuals involved in the communications, and the like, that are indicative of a need for a greater amount of problem resolution management, a higher priority of the problem resolution management, or the like.

Both the type of data and the priority may be used to determine the class since they are both valuable inputs to the correlation and normalization process described herein. For example, a piece of data may be classified as "high priority/informal conversation". For an informal conversation, there is no convention or mandated structure so when correlating the data the classification engine 450 may use statistical analysis for identifying the pieces of data to be used for classification. On the other hand, if a piece of data is "high priority/problem report" then there will be a definite set of attributes that the classification engine 450 can use to classify and correlate the data, such as the problem report ID or the like.

For example, a classification rule 455 may specify that a frequent use of a particular word or phrase, such as "escalated," "critical," "must be resolved," "urgent help needed," or the like anywhere in the headers or the body text of a communication is an indication of the data being related to a critical problem and thus, the corresponding communication data may be classified into a class of "critical problem." Another example classification rule 455 may be that the use of certain electronic mail headers may indicate an urgency of the related problem, e.g., the use of a flag header of "high importance" in an electronic mail message. As another example, a classification rule 455 may indicate that a number of actors, i.e. individuals involved in communications regarding resolution of the problem, and types or roles of these actors may be used to determine the urgency of the problem, e.g., if an electronic mail or instant message thread about a problem contains a large number of individuals who are executives, then it is likely that the problem needs to be dealt with quickly and should have a higher priority over other reported problems.

With regard to patterns of activity, threads of related communications may be analyzed by the content classification engine 450 based on the classification rules 455 to determine a pattern of the related communications with regard to the types of communications, the corresponding urgency determined with regard to the individual communications, the particular actors involved in the communications, the timing of the communications, or the like. For example, in a threaded electronic mail communication, the thread of electronic mail messages passed back and forth may be analyzed to determine the time period over which the electronic mail messages are passed where a long period of time indicates a problem that requires increased management operations since it is a problem that has persisted for a relatively long time. Moreover, if the timing of the various communications in the thread of electronic mail communications have short intervals between the communications, this may be indicative of a problem that is urgent or critical since it would indicate that actors or individuals are actively trying to resolve the problem quickly. Moreover, the thread of communications can be analyzed to determine if the types or roles of the individuals involved in the communications are escalating in relative organizational importance, e.g., going from a communications between a customer and a first level support individual followed by communications between the customer and a second level support individual, etc.

The content classification engine 450 will take into account the context in which data was collected for efficiency and accuracy. That is, as with the collection rules data structures 440-444 which may have rules customized to the particular context or type of system from which data is being collected, the classification rules 455 may also have rules that are customized for the particular context from which the collected data was obtained. The content classification engine 450 may apply the appropriate rules for the particular context to the collected data being analyzed based on the identified source of the collected data, which may be specified in the collected data such as by way of an identifier in a header or the like indicating what data collection agent forwarded the collected data or an indicator of the particular source, e.g., communication system 420-424, from which the data was collected.

For example, for a data that was collected from the problem management system 426, the content classification engine 450 may use relatively more reliable indicators such as a priority field associated with an entry corresponding to a reported problem. However, for electronic mail messages or instant messages, it may be necessary to analyze the patterns of activities, i.e. the pattern of communications/messages, to infer the classification of the collected data. Thus, depending on the particular context from which the data was collected, the data may be classified in a different manner from other collected data.

For example, in one illustrative embodiment, there is basically two sets of classes, one for denoting a priority of the problem and one for describing the type of data. For priority classes, the following classes may be defined: High—a greater management required and an immediate action is recommended; Medium—no immediate action required but should be monitored closely; Low—no intervention required and can be ignored from further analysis.

Depending on the origin of the data, the determination of the priority may be different. For example, for problem report data from the problem management system 426, the problem management system's own classification of priority will directly translate to a problem classification. For informal communications, the frequent use of words "urgent", "escalated," etc. (as mentioned above) may be used as a basis for determining the priority class.

The type of data classification may be based on the particular origin of the data. Type of data classifications may be, for example, formal, informal, problem reporting system, non-problem reporting system, or the like. Various types of communications and systems from which data are obtained may be classified into these various classifications and thus, the corresponding data obtained from these communications and systems may be classified into these various type of data classifications.

The result of the operation of the content classification engine 450 is one or more sets of collected data that have the same associated classification tags indicating one or more classes in which the classification engine 450 has classified the collected data based on the classification rules 455 and the context from which the collected data was obtained. The results of the content classification engine 450 are provided to the correlation engine 460 which operates on the received result data from the content classification engine 450 to determine which data in the results are related to one another in accordance with the correlation rules 465. Moreover, the correlation engine 460 may provide additional information to further refine the classification performed by the content classification engine 450.

The correlation rules 465 may specify particular attributes, collections of attributes, and patterns of attributes, in the collected and classified data that are indicative of data that is related to a same reported problem. For example, the correlation rules 465 may specify that data having a same problem/support ticket number are related to each other, data having a same customer name and geographical region are related to each other, data having a same name and version of software components involved are related to each other, data indicating a same client environment (e.g., type of CPU, amount of memory, same operating system, etc.) are related to each other, and data corresponding to a problem description having similar recognizable terms are related to each other. The collected and classified data are analyzed by the correlation engine 460 in accordance with the attributes and rules specified in the correlation rules 465 to generate sets of classified and correlated data. That is, data from various sources having various classifications may be correlated into a common set directed to the same reported problem. The correlated sets of data may then be provided to the normalization engine 470.

The normalization engine 470 aggregates the correlated data to produce a concrete description of the reported problem as determined from the various classifications of the collected data included in the set of correlated data corresponding to the reported problem. Thus, for example, a set of correlated data may comprise data from email communications between a customer and a support team member that have been classified as "needs greater management" as well as communications from the support team member and a subject matter expert via an instant messaging system indicating that they are classified as "problem urgent." From these classifications, it can be determined by the normalization engine 470 that the importance of the reported problem needs to be elevated to urgent and that additional problem management resources need to be allocated to resolving this reported problem.

The schema/data format for the output of the normalization will be typically determined by the schema of the problem management system 426. For example, the problem management system 426 may include both priority and severity attributes as part of the schema to describe a problem. Severity describes the impact caused by the problem. Priority describes the order in which problems should be worked on by the support term, or the amount of resource to allocate. For both severity and priority, either a numerical rating (e.g. 1-5) or textual rating (high/medium/low) may be used. What is important is not the exact schema, but that the normalization rules are sufficiently flexible to address a variety of these known approaches for specifying severity and priority. Thus, the mechanisms of the illustrative embodiments may be used with various schema/data formats and with various problem management system 426 schema/data formats.

The resulting normalized representation of the collected, classified, and correlated data from the various sources 420-426 may then be fed back into the content classification engine 450 to perform further refinement of the classification of the collected data corresponding to the reported problem. Furthermore, the normalized output of the normalization engine 470 may be output to the problem management system 426 which may process the normalized output to correlate the normalized output with entries for reported problems in the reported problem database 436. Moreover, the normalized output may be used by the problem resolution management module 446 to modify management operations being performed by the problem management system 426, such as sending notifications to appropriate personnel to resolve the problem, or the like. The normalized output provides a more concise and accurate description of the problem in that the normalized output provides a complete and concise description of the problem from all possible sources so that the use of the normalized output to update the information maintained in the problem management system 426, all actors involved in the problem management will have all the required information for resolving the problem in one centralized location.

Thus, the mechanisms of the illustrative embodiments operate to collect, classify, and correlate data from various sources, such as communication systems, problem management systems, and the like, according to reported problems with a complex software system. The mechanisms of the illustrative embodiments provide a unified view of the reported problem that may be accessible via a problem management system 426 so that individuals working on the resolution of a reported problem are given access to data and information that may not have otherwise been accessible to them since they were not privy to the communications being exchanged or a different set of information was being provided to that individual as opposed to other individuals involved in the resolution of the problem. For example, information provided by the customer to a support team member in a first communication may not have been relayed to a subject matter expert when the support team member contacted the subject matter expert and thus, the subject matter expert would not normally have access to that information. However, through implementation of the present invention, such information may be collected, classified, and correlated and provided to a problem management system such that the subject matter expert is able to access it.

It should be appreciated that the data collection, classification, correlation, and normalization are all done automatically without the need for human intervention. Thus, while in some systems mechanisms are provided for allowing various individuals to post their comments to a same problem/support ticket in a centralized problem management system, these systems require the individual to input the information into a centralized location directly and limits the channel of communications that the individuals can use to only a formal channel of communication with the centralized system. The mechanisms of the illustrative embodiments allow the individuals to confer with each other via formal communication channels, informal communication channels and the like, which are automatically monitored so that data can be collected, classified, and correlated with each other automatically and used to update problem management system data regarding a reported problem and even automatically modify problem resolution operations being performed by the problem management system 426.

Having described the mechanisms of the illustrative embodiments, the following is an example of an operation involving these mechanisms to further illustrate the operation of the mechanisms of the illustrative embodiments. Initially, assume that a customer 410 creates a problem report in the vendor's problem management system 426 which includes information such as the problem description, priority/severity, customer name and contact details, hardware and software inventory (type, vendor and version), and configuration of the hardware and software inventory. The problem management system 426 creates and assigns a unique identifier for the problem report and generates the problem report data structure(s) in the reported problem database 436.

Assume that a support team member 414 sends an email to the customer 410 and an onsite consultant 412, such as via email system 420, requesting more information about the problem. The consultant 412 then sends the requested information via a return email via email system 420. The customer 410 also provides additional information via an email through email system 420. The support team member 414 collates the information in both emails and enters only a subset of information in the problem management system 426. The support team member 414 then searches well-known discussion forums 424 to determine if this is a known problem and also submits a question in one or more of the forums 424. A subject matter expert 416 responds to the question in one of the forums 424 and the support team member 414 uses an instance messaging system 422 to have an in-depth conversation with the subject matter expert 416 regarding the problem.

A summary of the diagnosis resulting from the conversation is entered into the problem management system 426. The support team member 414 emails the customer 410 with the diagnosis and recommended actions to take to resolve the problem. The problem is not resolved and the customer 410 increases the severity of the problem in the problem management system 426 and also sends an email requesting an escalation via the email system 420.

With the mechanisms of the illustrative embodiments, a data collection agent 430 on the email system 420 collects the emails sent and received by the support team member 414 and the customer 410 and sends them to the content classification engine 450. The content classification engine 450 identifies key attributes in the emails that are related to problems. These include the problem report identifier, customer names, and words related to a critical or urgent situation, for example. The content classification engine 450 classifies the information contained in the emails based on the identified attributes, e.g., high priority escalation email. The content classification engine 450 sends the classified data to the correlation engine 460.

The data collection agents 432 and 434 on the instant messaging system 422 and web-based discussion forum 424 collects instant messages and forum discussions involving the support team member 414 and the subject matter expert 416 and sends them to content classification engine 450. The content classification engine 450 classifies the data based on the key attributes related to problems. The content classification engine 450 sends the classified data to the correlation engine 460.

The correlation engine 460 identifies data from different sources that are related to the same problem. The correlation engine 460 sends all related problem data to normalization engine 470. The normalization engine 470 aggregates (augments the detail) and summarizes (removes duplicates) the correlated data. The normalization engine 470 also transforms the data to a standard format. The normalization engine 470 sends the normalized data to problem resolution management module 446 on the problem management system 426.

The problem resolution management module 446 updates the problem report in the reported problem database 436 to provide more detail based on the received normalized data from the normalization engine 470 and also clarifies and corrects existing information in the problem report. The problem resolution management module 446 determines actions to take based on the details of the problem. For example, the problem resolution management module 446 may notify a problem manager indicating that the problem is sufficiently complex and/or is about to be escalated, and thus, requires a greater coordination and investigation. In this way, the mechanisms of the illustrative embodiments are able to collect problem relevant data from a plurality of disparate sources into a collection of data that is then normalized and used to update problem reports so as to provide as much relevant information for resolving the problem as possible in one centralized location where individuals working on the resolution of the problem may access the information.

Figure 5:
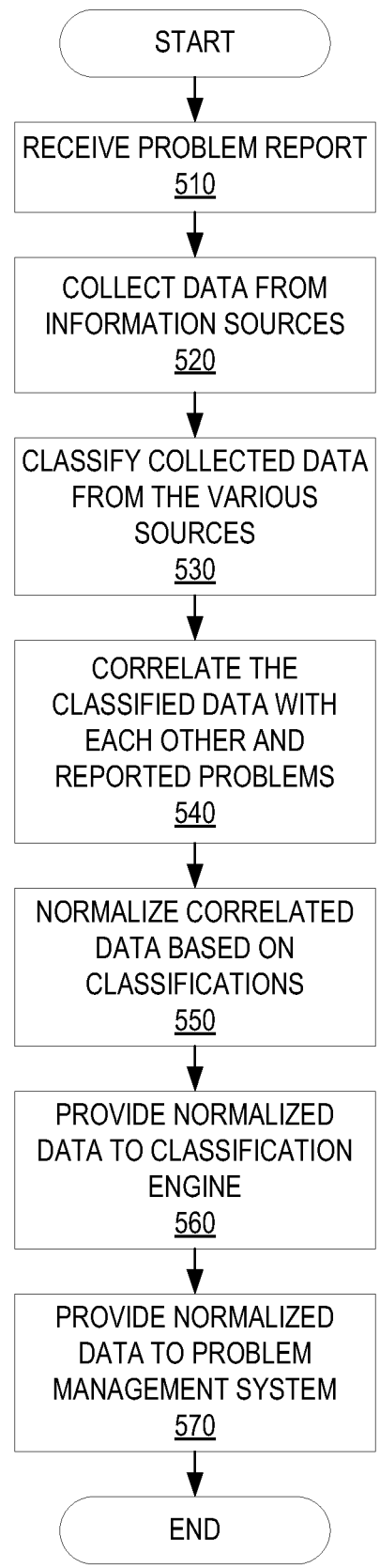
FIG. 5 is a flowchart outlining an example operation for performing coordinated problem resolution in accordance with one illustrative embodiment.

FIG. 5 is a flowchart outlining an example operation for performing coordinated problem resolution in accordance with one illustrative embodiment. The operation outlined in FIG. 5 may be performed, for example, by one or more computing devices implementing various aspects of the illustrative embodiments as described above. Thus, the operations outlined in FIG. 5 may be implemented by software components executing on one or more hardware devices of one or more computing devices in a distributed data processing system, for example.

As shown in FIG. 5, the operation starts with the reporting of a problem by an end user via a problem management system (step 510). Data collection mechanisms collect data from various sources of information that may provide information about the reported problem in accordance with pre-established data collection rules (step 520). In one illustrative embodiment, these sources of information are communication systems used by end users and other individuals of an organization to communicate with one another either generally (e.g., email, instant messaging, etc.) or specifically with regard to reported problems (e.g. web-based discussion forums, a problem management system, etc.).

The collected data is provided to a content classification engine which classifies the collected data into various classes in accordance with pre-established classification rules (step 530). The resulting collected and classified data is provided to a correlation engine which correlates the collected and classified data into sets of data corresponding to a same reported problem (step 540). The correlated sets of data are then provided to a normalization engine to generate an aggregated and normalized representation of the reported problem of each set as determined from the classification of the data contained with each particular set (step 550). The normalized representation output may then be provided back to the content classification engine 450 to refine the classification of the data within the sets (step 560). The normalized representation output may also be provided to a problem management system to update the entries in the problem management system regarding the reported problem with information from the normalized representation and to further modify problem resolution operations being performed by the problem management system (step 570). The operation then terminates.

It should be appreciated that while FIG. 5 illustrates the data collection, classification, correlation, and normalization being performed in response to a reported problem, in actuality these operations may be continuously or periodically performed independently of the reporting of problems. In such a case, the mechanisms of the illustrative embodiments continue to operate in the background of the data processing system and when a problem is reported it then becomes a reported problem with which collected and classified data may be correlated. Furthermore, it should be appreciated that while FIG. 5 shows a termination of the operation, in actuality, the operation may be continuous or performed periodically with additional problems being reported at various times.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising at least one computing device, for correlating reported problem data from a plurality of sources of information, comprising:
   receiving, in a problem management system of the data processing system, a report of a problem to thereby generate a reported problem in the problem management system;
   performing data collection on a plurality of electronic communications exchanged, subsequent to receiving the report of the problem, between human users using electronic communication mechanisms of a plurality of types within the data processing system in accordance with data collection rules to generate collected data, wherein the plurality of types of electronic communication mechanisms comprise a formal communication mechanism for communicating directly with the problem management system, and an informal communication mechanism for exchanging electronic communications between human users without targeting the problem management system;
   performing content classification on the collected data to classify the collected data into pre-determined classes of collected data in accordance with classification rules to thereby generate classified data, wherein the classification rules comprise a plurality of classification rules customized for a plurality of contexts of electronic communication mechanisms from which the collected data is collected;
   performing correlation of the classified data into one or more sets of correlated data in accordance with correlation rules, wherein each set of correlated data corresponds to a different reported problem in the problem management system, and wherein each of the correlation rules specify a pattern of one or more attributes of collected data, that has been classified by the content classification, indicative of a corresponding reported problem; and
   updating a representation of the reported problem in the problem management system based on a set of correlated data corresponding to the reported problem and classifications of data within the set of correlated data at least by normalizing the correlated data by aggregating attributes of the correlated data to generate an aggregated value that is representative of attributes of the correlated data.

2. The method of claim 1, wherein the informal communication mechanism comprises at least one of an electronic mail system, an instant messaging system, or a web-based discussion forum.

3. The method of claim 1, wherein performing data collection comprises collecting data from a plurality of electronic communications exchanged between a plurality of users utilizing a plurality of different informal communication mechanisms of different types, wherein the different informal communication mechanisms of different types comprises at least two different types selected from the following types: an electronic mail system, an instant messaging system, and a web-based discussion forum.

4. The method of claim 1, wherein performing data collection comprises using one or more data collection agents on each of electronic communication mechanisms to collect data from data structures of the electronic communication mechanisms in accordance with data collection rules.

5. The method of claim 4, wherein the data collection rules specify data elements to be searched for in the data structures, wherein the data elements are indicative of the data structure being associated with a reported problem.

6. The method of claim 1, wherein performing content classification on the collected data comprises classifying the collected data in accordance with one or more priority classes, one or more data type classes, and one or more severity classes.

7. The method of claim 1, wherein performing correlation of the classified data into one or more sets of correlated data comprises determining which portions of the classified data relate to a same reported problem and correlating the portions of the classified data that relates to the same reported problem together into a same set of correlated data.

8. The method of claim 1, further comprising:
   determining a problem resolution management operation to be performed based on the updated representation of the reported problem in the problem management system; and
   executing the problem resolution management operation.

9. A non-transitory computer readable medium having a computer readable program stored therein, wherein the computer readable program, when executed in a data processing system, causes the data processing system to:
   receive a report of a problem to thereby generate a reported problem in a problem management system of the data processing system;
   perform data collection on a plurality of electronic communications exchanged, subsequent to receiving the report of the problem, between human users using electronic communication mechanisms of a plurality of types within the data processing system in accordance with data collection rules to generate collected data, wherein the plurality of types of electronic communication mechanisms comprise a formal communication mechanism for communicating directly with the problem management system, and an informal communication mechanism for exchanging electronic communications between human users without targeting the problem management system;
   perform content classification on the collected data to classify the collected data into pre-determined classes of collected data in accordance with classification rules to thereby generate classified data, wherein the classification rules comprise a plurality of classification rules customized for a plurality of contexts of electronic communication mechanisms from which the collected data is collected;
   perform correlation of the classified data into one or more sets of correlated data in accordance with correlation rules, wherein each set of correlated data corresponds to a different reported problem in the problem management system, and wherein each of the correlation rules specify a pattern of one or more attributes of collected data, that has been classified by the content classification, indicative of a corresponding reported problem; and
   update a representation of the reported problem in the problem management system based on a set of correlated data corresponding to the reported problem and classifications of data within the set of correlated data at least by normalizing the correlated data by aggregating attributes of the correlated data to generate an aggregated value that is representative of attributes of the correlated data.

10. The non-transitory computer readable medium of claim 9, wherein the informal communication mechanism comprises at least one of an electronic mail system, an instant messaging system, or a web-based discussion forum.

11. The non-transitory computer readable medium of claim 9, wherein the computer readable program causes the data processing system to perform data collection by collecting data from a plurality of electronic communications exchanged between a plurality of users utilizing a plurality of different informal communication mechanisms of different types, wherein the different informal communication mechanisms of different types comprises at least two different types selected from the following types: an electronic mail system, an instant messaging system, and a web-based discussion forum.

12. The non-transitory computer readable medium of claim 9, wherein the computer readable program causes the data processing system to perform data collection by using one or more data collection agents on each of electronic communication mechanisms to collect data from data structures of the electronic communication mechanisms in accordance with data collection rules.

13. The non-transitory computer readable medium of claim 12, wherein the data collection rules specify data elements to be searched for in the data structures, wherein the data elements are indicative of the data structure being associated with a reported problem.

14. The non-transitory computer readable medium of claim 9, wherein the computer readable program causes the data processing system to perform content classification on the collected data by classifying the collected data in accordance with one or more priority classes, one or more data type classes, and one or more severity classes.

15. The non-transitory computer readable medium of claim 9, wherein the computer readable program causes the data processing system to perform correlation of the classified data into one or more sets of correlated data by determining which portions of the classified data relate to a same reported problem and correlate the portions of the classified data that relates to the same reported problem together into a same set of correlated data.

16. A data processing system, comprising:
    a problem management system implemented by at least one processor;
    a content classification engine implemented by at least one processor and coupled to the problem management system; and
    a correlation engine implemented by at least one processor and coupled to the problem management system and the content classification engine, wherein:
    the problem management system receives a report of a problem to thereby generate a reported problem in the problem management system;
    the content classification engine receives collected data from data collection agents associated with a plurality of electronic communications exchanged, subsequent to receiving the report of the problem, between human users using electronic communication mechanisms of a plurality of types in accordance with data collection rules, wherein the plurality of types of electronic communication mechanisms comprise a formal communication mechanism for communicating directly with the problem management system, and an informal communication mechanism for exchanging electronic communications between human users without targeting the problem management system;
    the content classification engine performs content classification on the collected data to classify the collected data into pre-determined classes of collected data in accordance with classification rules to thereby generate classified data, wherein the classification rules comprise a plurality of classification rules customized for a plurality of contexts of electronic communication mechanisms from which the collected data is collected;
    the correlation engine performs correlation of the classified data into one or more sets of correlated data in accordance with correlation rules, wherein each set of correlated data corresponds to a different reported problem in the problem management system, and wherein each of the correlation rules specify a pattern of one or more attributes of collected data, that has been classified by the content classification, indicative of a corresponding reported problem; and
    the problem management system updates a representation of the reported problem in the problem management system based on a set of correlated data corresponding to the reported problem and classifications of data within the set of correlated data at least by normalizing the correlated data by aggregating attributes of the correlated data to generate an aggregated value that is representative of attributes of the correlated data.

* * * * *